(12) United States Patent
Kim (10) Patent No.: US 7,734,863 B2
(45) Date of Patent: Jun. 8, 2010

(54) METHOD FOR GUARANTYING DATA STORING SPACE USING DUAL JOURNALING

(75) Inventor: Jeong-Ki Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 484 days.

(21) Appl. No.: 11/909,078

(22) PCT Filed: Nov. 13, 2006

(86) PCT No.: PCT/KR2006/004746

§ 371 (c)(1),
(2), (4) Date: Sep. 18, 2007

(87) PCT Pub. No.: WO2007/066909

PCT Pub. Date: Jun. 14, 2007

(65) Prior Publication Data

US 2008/0168213 A1    Jul. 10, 2008

(30) Foreign Application Priority Data

Dec. 8, 2005   (KR) .................. 10-2005-0119465
Nov. 8, 2006   (KR) .................. 10-2006-0110165

(51) Int. Cl.
*G06F 12/00* (2006.01)
(52) U.S. Cl. .................. 711/103; 711/170; 711/171
(58) Field of Classification Search .................. None
See application file for complete search history.

(56) References Cited

U.S. PATENT DOCUMENTS 6,104,638 A   8/2000   Larner et al.

(Continued)

FOREIGN PATENT DOCUMENTS

JP   2002-149483   5/2002

(Continued)

OTHER PUBLICATIONS

Chiang, M.L. et al., "Managing flash memory in personal communication devices," IEEE, pp. 177-182 (1997).

(Continued)

*Primary Examiner*—Than Nguyen (57) ABSTRACT

Since JFFS, which is used as an existing method of storing data in a flash memory, stores all data sequentially according to a generated order, pure data of a file system and metadata for managing the pure data must be sequentially stored. Thus, when a PC is turned on and mounts the file system, since all metadata must be read to RAM, the entire space of the flash memory must be read, and thus a long time is taken to mount the file system. An increase in the capacity of the flash memory causes an increase in the mounting time. Thus, a booting time taken to turn on and use an embedded system significantly increases. Accordingly, JFFS is not suitable for embedded systems requiring quick access. A data storage space is secured by dividing a free list of segments that are used as a data storage space of a flash memory into a front journaling free list and a rear journaling free list by setting a central point of the segment free list, determining whether enough free segments are secured in the front journaling free list, and if it is determined that not enough free segments are guarantied, collecting garbage data from among stored data with reference to a wear-leveling threshold and a valid data threshold which are set in segments in which data is stored.

6 Claims, 3 Drawing Sheets

U.S. PATENT DOCUMENTS

| | | | |
|---|---|---|---|
| 6,260,103 B1 * | 7/2001 | Alexis et al. | 711/103 |
| 6,604,168 B2 | 8/2003 | Ogawa | |
| 6,715,027 B2 | 3/2004 | Kim et al. | |
| 6,725,241 B1 * | 4/2004 | Rodriguez et al. | 707/203 |
| 2001/0013269 A1 * | 8/2001 | Tanji | 84/601 |

FOREIGN PATENT DOCUMENTS

| | | |
|---|---|---|
| KR | 10-20050079991 A | 8/2005 |
| KR | 10-20050083850 A | 8/2005 |
| KR | 10-2005-0090308 A | 9/2005 |
| WO | WO2004/059624 A1 | 7/2004 |
| WO | WO 2004/059624 A1 | 7/2004 |
| WO | WO 2004/069624 A2 | 8/2004 |

OTHER PUBLICATIONS

Kim, J.K. et al., "Dual journaling Store Method of Embedded Systems," ICACT 2006 Conference, ETRI, 4pages (2006).

Someya. T. el al., "Conformable, flexible, large-area networks of pressure and thermal sensors with organic transistor active matrixes," Proceedings of the National Academy of Sciences of the USA, vol. 102, No. 35:1231-5 (Aug. 30, 2005).

* cited by examiner

FRONT JOURNALING FREE LIST

METHOD FOR GUARANTYING DATA STORING SPACE USING DUAL JOURNALING

CROSS-REFERENCE TO RELATED APPLICATIONS

This application is a U.S. National Stage Application under 35 U.S.C. 371 of International Application No. PCT/KR2006/004746, filed on Nov. 13, 2006, which claims the benefit of Korean Application No. 10-2006-0110165, filed Nov. 8, 2006, and Korean Application No. 10-2005-0119465, filed Dec. 8, 2005, the complete disclosures of which are incorporated herein by reference.

TECHNICAL FIELD

The present invention relates to a method of guarantying a data storage space using dual journaling, and more particularly, to a method of guarantying a data storage space using dual journaling when a flash memory is used as a data storage medium.

BACKGROUND ART

Recently, accompanying the development of information and communication technology and mobile computing technology, embedded systems, such as Personal Digital Assistants (PDAs), Hand-held Personal Computers (HPCs), mobile phones, e-books, and the like, have been developed. Embedded systems mainly use a flash memory as a storage medium.

In general, a flash memory has characteristics similar to Read Only Memory (ROM) and has different characteristics to hard disks. A flash memory is similar to ROM or a hard disk in that stored data is maintained even if power is turned off, since it is a nonvolatile memory, and is more reliable than a hard disk. A flash memory can operate with low power, and has an access time as quick as Random Access Memory (RAM). A flash memory is rewritable and is suitable for portable devices due to its small size.

However, a flash memory is much more expensive than a hard disk, and if a user wishes to write new data in a space occupied by an old data, an erasing the old data is necessary before the new data is written. There is a problem in that the time taken to perform the erasing is 100 times longer than a time to read a data.

Based on a 28F640J3A model flash memory developed by Intel Co., a time to read data is 100-150 nsec, which is similar to RAM, however, a time to write and erase data is relatively slow. A time to write data using a 32-byte buffer is around 218 μsec, and a data write time of an erase block unit is around 0.8 sec per block. In addition, the size of an erase block, in which all data can be erased at once is fixed to 128 Kbytes, and the number of times the erase block can be used at a normal temperature is fixed to around 100,000 times. The erase block indicates a space of a flash memory in which all data can be erased at once and is called a segment.

Conventional technologies for building a file system using a flash memory are disclosed in U.S. Pat. No. 5,404,485 entitled "Flash File System" and a paper, pages 155-164, entitled "A Flash Memory Based File System," USENIX Technical Conference, 1995. In addition, Journaling Flash File System (JFFS) in which a log-structured file system is applied to a flash memory was disclosed in U.S. Pat. No. 6,128,630 entitled "Journal Space Release for Log-structured Storage Systems" and U.S. Pat. No. 5,530,850 (변호변경)entitled "Data Storage Library Array with Log-structured File System Which Allows Simultaneous Write and Garbage Collection".

A log-structured file system allows a file system to be constituted in a hard disk, allows versions of previous data and newly updated data to be maintained in a log format using a method of sequentially storing generated data, and allows data in which a problem has occurred to be recovered by going back to previous data.

JFFS allows a file system to be constituted in a flash memory using a log-structured file system and allows generated data to be sequentially stored. JFFS was developed by Axis Communications in the United States, and JFFS2 corresponding to version 2 thereof was developed by RedHat in the United States based on GNU Public Licenses (GPL) of Free Software Foundation (FSF).

One important reason why a journaling method is used when a file system is constituted in a flash memory by JFFS is that the integrity of data can be guaranteed. According to a characteristic of embedded systems commonly using a flash memory, the possibility that the supply of power is suddenly cut off is very high. In general, when a computer system reads or writes data, for storage efficiency, the computer system uses a method of storing the data in a buffer, performing a predetermined operation related to the data, and storing the data in a storage medium without directly storing the data in the storage medium.

In this case, if power is suddenly turned off, intermediate data disappears, and it is difficult to detect a proceeding state of data remaining in the storage medium. In addition, most additional meta data for creating a storage structure or a file system is temporarily stored in RAM. If this meta data disappears, it is difficult to guarantee the integrity of data or the file system.

Thus, the journaling method is used, and if data is logged and stored using the journaling method, the integrity of data can be easily guaranteed, and the amount of metadata decreases, and thus the metadata can be easily managed.

However, the biggest problem of JFFS is that since all data is stored in the order it was generated, files of a file system and metadata for managing the files must be sequentially stored. According to JFFS, when a personal computer (PC) is turned on and a file system is mounted, since all metadata must be read and transferred to RAM, the entire space of a flash memory must be read, and thus a very long time is required for the mounting process.

As the capacity of a flash memory increases, the time required for the mounting process increases significantly, and thus a booting time taken to turn on and use an embedded system increases proportionally. Due to this, JFFS is not suitable for embedded systems to which quick access is required.

Besides the simplicity of storing and the integrity, another reason for sequentially storing data using the journaling method is that wear-leveling must be considered. A flash memory cannot be used indefinitely. Although the lifespan of a flash memory varies from product to product, a flash memory can be reused around 100,000 to 1,000,000 times.

Since this lifespan is applied to each segment that is an erase block unit, if a lifespan of a specific segment of a flash memory ends since an erase and write operation is concentrated in the specific segment, the flash memory cannot be used or the useless segment must be separately managed. In order to prevent this problem, wear-leveling, whereby an erase operation is evenly for all segments, must be achieved.

Since the journaling method sequentially performs the erase operation, wear-leveling is naturally achieved.

However, a sequential erasing method to achieve the wear-leveling causes a decrease in the data input/output rate of the entire system. In a journaling storing method, a location of a store operation will be referred to as a "head", and a location of an erase operation will be referred to as a "tail". Before the store operation is performed from a first free space of a flash memory to the end and the head reaches the end of the flash memory, only if a segment indicated by the tail is erased in a state where there exist some free spaces, data can be continuously stored in the flash memory.

While the head is used to store data toward the end of the flash memory, useless data and newly updated data may exist. In this case, the useless data of the flash memory is not erased but represented in an invalid state. For the updated data, data before the updating is performed is represented in the invalid state, and the updated data is stored in a segment indicated by the head. By doing this, when a problem occurs, recovery is easily performed, and the integrity can be maintained. During this process, when a segment indicated by the tail must be erased, if all data in the segment is invalid, the segment can be immediately erased, but if valid data exists in the segment, the segment can be erased only after the valid data is moved to a segment indicated by the head. However, if almost all data in the segment indicated by the tail is valid, a long time is required to move the valid data to the segment indicated by the head. This phenomenon occurs since the erase operation is sequentially performed even if a segment in which most data is invalid exists in an intermediate portion of journaling.

A reason why a segment indicated by the tail is erased is because a storage space of the flash memory is insufficient, and if all of the segment indicated by the head is used to move the valid data, even if the segment of the tail part is erased, a storage space is still insufficient, and thus this process must be repeated. If such data is fixed data continuously remaining in a system, the above process must be performed every time journaling is performed. This significantly decreases the performance of the system.

In order to prevent the above problems, if valid data occupies most of a segment, the segment is skipped without being erased. However, if the segment is simply not erased, it violates the wear-leveling, and thus a compromising scheme must be found between the skipping and wear-leveling. In addition, users desire a fast booting time regardless of what internal storage medium is used, and conventional journaling storing methods cannot satisfy these requirements.

DETAILED DESCRIPTION OF THE INVENTION

Technical Problem

The present invention provides a method of guarantying a data storage space, by which data can be effectively stored in a storage medium by modifying an existing journaling storing method.

Technical Solution

A technical solution of the present invention is achieved by dividing a free list of segments that are used as a data storage space of a flash memory into a front journaling free list and a rear journaling free list by setting a central point of the segment free list, and determining whether enough free segments are guarantied in the front journaling free list, and if it is determined that not enough free segments are guarantied, guarantying a data storage space by collecting garbage data from among stored data with reference to a wear-leveling threshold and a valid data threshold which are set in segments in which data is stored.

Advantageous Effects

According to the present invention, if a dual journaling storing method is used when data is stored in a storage medium, by using an erase-delayed method and a segment free list, a data storing rate can be increased, a system booting time can be reduced, and efficient central point management can be performed, thereby increasing the efficiency of wear-leveling.

In addition, since a threshold of the wear-leveling is set, even if power is suddenly cut off, a file system can be easily recovered, and even if free lists are lost, recovery of the free lists can be easily performed by creating the free lists from start and end locations of a flash memory.

DESCRIPTION OF THE DRAWINGS

The above and other features and advantages of the present invention will become more apparent by describing in detail exemplary embodiments thereof with reference to the attached drawings in which.

BEST MODE

According to an aspect of the present invention, there is provided a method of storing data, the method comprising: dividing a free list of segments that are used as a data storage space of a flash memory into a front journaling free list and a rear journaling free list by setting a central point of the segment free list, and determining whether enough free segments are secured in the front journaling free list; and if it is determined that not enough free segments are guarantied, guarantying a data storage space by collecting garbage data from among stored data with reference to a wear-leveling threshold and a valid data threshold which are set in segments in which data is stored.

Mode of the Invention

A core method suggested in the embodiments of the present invention to address the above-described problems is a Dual Journaling File System (DJFS) method, i.e., a dual journaling storing method. The dual journaling storing method is disclosed in Patent Cooperation Treaty (PCT) WO 2004/059624 A1 entitled "Dual Journaling Store Method and Storage Medium Thereof".

The PCT patent suggests a DJFS in order to address the problems, which uses the dual journaling storing method in which two sorts of data are stored in a storage medium, one being stored from a start location in a forward journaling direction and the other being stored from an end location in a backward journaling direction.

By using the dual journaling storing method, since pure data of a file system is stored from the start location and metadata of the file system is stored from the end location, the pure data and the metadata are not mixed. Thus, a booting time can be reduced by reading from only a rear portion of the storage medium in which a relatively small amount of metadata is stored instead of reading from the entire storage medium in order to mount the file system.

However, even when the PCT patent is applied, a repetitive erase operation of fixed data is necessary, and thus wear-leveling cannot be achieved. In order to address these problems, in an embodiment of the present invention, an improved dual journaling storing method introducing a segment free list and an erase-delayed method is suggested.

Hereinafter, the present invention will be described in detail by explaining preferred embodiments of the invention with reference to the attached drawings. Like reference numerals in the drawings denote like elements.

In embedded systems commonly using a flash memory as a storage medium, users want devices to respond immediately by means of fast booting. In addition, since many of these devices are mobile devices, the power of the devices is turned on and off from time to time. This characteristic requires the storage structure of a storage device to be robust, does not allow a file system to be damaged due to sudden loss of power, and requires that a long time is not taken for recovery even if a problem occurs.

If the above characteristic is applied to devices using a flash memory, the time taken to mount a file system in a flash memory must be minimized, robustness of the file system must be maintained against sudden loss of power, recovery time must be minimized, and the lifespan of the flash memory does not have to be extended instead of sacrificing data read and write performance.

In order to satisfy the above conditions, the dual journaling storing method is used for a file system supporting a shorter mounting time and a fast recovery time by separately storing metadata. However, if a conventional dual journaling storing method is used to obtain wear-leveling of a flash memory and extend a lifespan of the flash memory by sacrificing read and write performance, the validity of the method decreases.

In order to solve this problem, an embodiment of the present invention provides an erase-delayed dual journaling storing method as described above. The meaning of "erase-delayed" is that if the amount of valid data in a segment is greater than a predetermined amount, even if the segment must be erased according to an erase order, an erase operation is delayed without immediately erasing the segment. The reason for this is because if a segment in which the amount of valid data is greater than the predetermined amount is erased, since the time for moving the valid data in the segment is required without securing a meaningful vacant storage space in a flash memory, a data write time increases, resulting in decreasing system performance.

Thus, the amount of valid data, which is an erase criteria of a segment, must be set, and in an embodiment of the present invention, the predetermined amount is defined as a valid data threshold $T_v$, i.e., a threshold of the amount of valid data, and if only determination on whether an erase operation is delayed is considered, the valid data threshold $T_v$ can be set to an amount corresponding to half the size of a segment.

However, a segment having valid data exceeding the valid data threshold $T_v$ cannot be infinitely erase-delayed since a life span of the flash memory is reduced due to the continuance of the erase-delay. Thus, even if a segment has valid data exceeding the valid data threshold $T_v$, the erase operation must be performed case by case. In an embodiment of the present invention, in order to solve this problem, a wear-leveling threshold $T_e$, i.e., a threshold of an erase count, is set. Although a close examination of a correlation between the wear-leveling threshold $T_e$ and a lifespan of a flash memory is required, the wear-leveling threshold $T_e$ can commonly be set to 1/10 of a possible erase count.

In order to use the erase-delayed dual journaling storing method according to an embodiment of the present invention, data cannot be stored using the concept of head and tail of the conventional journaling method since a segment skipped without being erased exists due to the erase-delay.

To solve this problem, a storing method suggested in an embodiment of the present invention uses a segment free list described above.

Figure 1:
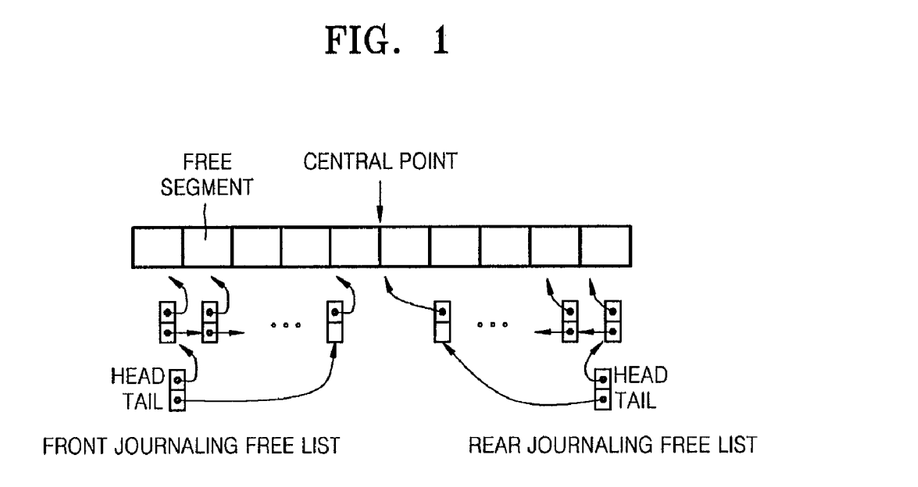
FIG. 1 illustrates a data storage structure using a segment free list according to an embodiment of the present invention.

FIG. 1 illustrates a data storage structure using a segment free list according to an embodiment of the present invention.

As illustrated in FIG. 1, a segment free list is constituted in a main memory of a system, and the segment free list is edited by applying pointers to free segments. In the dual journaling storing method according to an embodiment of the present invention, a segment free list is divided into a front journaling free list and a rear journaling free list based on the center location of free segments. Data is stored using a head of a free list, and a process of erasing a segment and attaching the erased segment to the segment free list is performed using a tail.

When the segment free list is initially constituted, the front journaling free list and the rear journaling free list may be created by setting a central point C of the segment free list based on the center location of the free segments, and after time goes by, the central point C may be adjusted.

When new data to be stored is input, the new data is stored in a segment indicated by the head, and first of all, it must be determined whether sufficient vacant storage space (free space) exists in the front or rear journaling free list. The minimum space for storing is at least two segments, since a valid space must be used to erase a segment, and the number of free segments, which is evaluated as enough space, corresponds to around 10% of the entire space of a flash memory.

If sufficient free space does not exist due to continuously stored data, an erase operation is performed using the tail. In this case, a segment having less valid data than the valid data threshold $T_v$ is first erased, and the erased segment is attached to the front or rear journaling free list. Here, the tail of the front or rear journaling free list indicates the newly attached segment. All segments excluding the front or rear journaling free list are segments in which data is stored, also known as "dirty segments". Thus, a location for storing data is always indicated by the head of the front or rear journaling free list, and the tail is used to guaranty a free segment.

Figure 2:
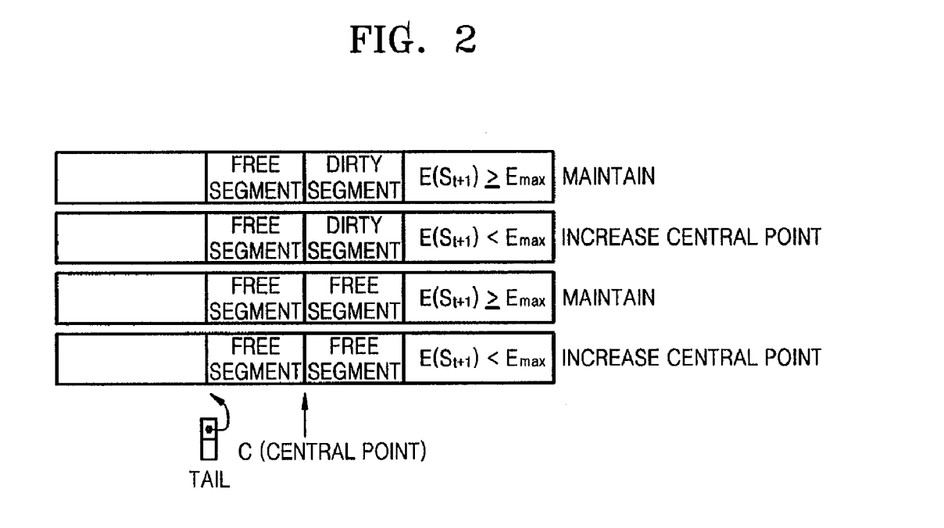
FIGS. 2 and 3 illustrate cases where a central point is moved according to an embodiment of the present invention.

When this store operation is repeated, a next location of the tail becomes the central point C as illustrated in FIG. 2. In this case, it must be determined whether the next segment is attached to the front or rear journaling free list. Here, the segment next to the central point C is not included in the front or rear journaling free list.

FIG. 2 illustrates a case where the central point C moves according to an embodiment of the present invention.

FIG. 2 illustrates a case where the front journaling increases. A segment next to the central point C corresponds to the rear journaling. In a conventional dual journaling storing method, a journaling first arriving at the central point C simply pushes a space of the other journaling (the front journaling to the rear journaling or the rear journaling to the front journaling). However, since the erase-delayed method and the free lists are used in an embodiment of the present invention, the simple push method cannot be used as it is, and it must be determined considering an erase count whether the erase-delay is performed.

The central point C is pushed to the other journaling space in order to provide wear-leveling if possible. However, if an erase count $E(S_{t+1})$ of a segment $S_{t+1}$ subsequent to a segment $S_t$ indicated by the tail is equal to or greater than the maximum erase count $E_{max}$ of front segments in which data is stored (hereinafter, 'front store segments'), an erase operation must proceed from a start location of the front journaling without moving to the central point C.

Four cases for determining whether the central point C is moved are illustrated in FIG. 2.

Whether the central point C is moved is determined by determining whether the erase count $E(S_{t+1})$ of the rear store segment $S_{t+1}$ is equal to or greater than the maximum erase count $E_{max}$ of the front store segments and whether the rear store segment $S_{t+1}$ is a dirty segment.

In FIG. 2, the segment $S_{t+1}$ subsequent to the segment $S_t$ indicated by the tail of the front journaling crosses over the central point C. Thus, it must be determined whether the segment $S_{t+1}$ that crosses over the central point C is included in the front journaling by moving the central point C. If the erase count $E(S_{t+1})$ of the rear store segment $S_{t+1}$ to be erased is equal to or greater than the maximum erase count $E_{max}$ of the front store segments, it means that the rear store segment $S_{t+1}$ has more frequently been erased than the front store segments, and thus the central point C does not have to be moved regardless of whether the rear store segment $S_{t+1}$ is a dirty segment or a free segment. That is, the position of central point C is maintained without being moved.

If the erase count $E(S_{t+1})$ of the rear store segment $S_{t+1}$ is less than the maximum erase count $E_{max}$ of the front store segments, it means that the rear store segment $S_{t+1}$ has been less frequently erased than the front store segments, and thus the central point C is moved forward to the segment $S_{t+1}$ and the segment $S_{t+1}$ is included in the front journaling by attaching the segment $S_{t+1}$ to the tail of the front journaling. This process is repeated by comparing an erase count of a rear store segment $S_{t+i}$ (i is a natural number equal to or greater than 2) to the maximum erase count $E_{max}$ of the front store segments until an erase count of the rear store segment $S_{t+i}$ to be compared is equal to or greater than the maximum erase count $E_{max}$ of the front store segments.

In this case, if valid data exists in the rear store segment $S_{+1}$, the valid data is stored in a segment indicated by the head of the rear journaling free list, the rear store segment $S_{t+1}$ is initialized to be a free segment and attached to the tail of the front journaling free list, and the central point C is increased by 1. If the rear store segment $S_{t+1}$ is a free segment, since the rear store segment $S_{t+1}$ does not have to be erased, the rear store segment $S_{t+1}$ is released from the rear journaling free list and attached to the tail of the front journaling free list, and the central point C is increased by 1. In this case, if the number of free segments in the rear journaling is less than the minimum number, the position of the central point C is maintained without being moved.

As a constraint, if the rear store segment $S_{t+1}$ is a dirty segment when the erase count $E(S_{t+1})$ of the rear store segment $S_{t+1}$ is less than the maximum erase count $E_{max}$ of the front store segments in the second case illustrated in FIG. 2, since valid data of the rear store segment $S_{t+1}$ must be moved, a method of increasing the central point C when the erase count $E(S_{t+1})$ of the rear store segment $S_{t+1}$ is less than the minimum erase count $E_{min}$ of the front store segments only if the rear store segment $S_{t+1}$ is a dirty segment may be used.

Figure 3:
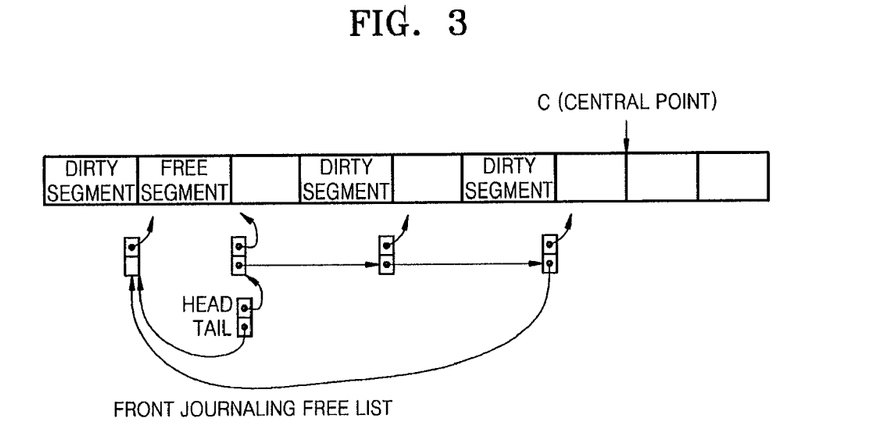

When the tail guaranties free segments by performing the above-described process, a segment subsequent to a segment indicated by the tail can be a head position as illustrated in FIG. 3. This means that a storage space of the flash memory remains small. However, in an embodiment of the present invention, since free segments are guarantied using the valid data threshold $T_v$ in the erase-delayed method, a space that can be a vacant space still remains.

If a tail position does a complete cycle and exceeds a head position, a method of increasing the valid data threshold $T_v$ can be used. For example, when the erase-delayed method is initially used, only segments in which the amount of valid data is more than ⅓ of the total amount remain without being erased, however, if a tail position does a complete cycle and exceeds a head position, only segments in which the amount of valid data is more than ⅔ of the total amount remain without being erased, and the others are erased to secure a free space.

As another example, if it is assumed that the front or rear journaling free list makes N complete cycles, the valid data threshold $T_v$ can be set by giving a weighting to segments in which the amount of valid data is more than 1/N of the total amount so that they remain without being erased at first, to segments in which the amount of valid data is more than 2/N of the total amount so that they remain without being erased next time, to segments in which the amount of valid data is more than 3/N of the total amount so that they remain without being erased next time, and so forth. However, in this case, segments exceeding the wear-leveling threshold $T_e$ are erased.

The process of securing a vacant space by moving valid data to a segment indicated by the head and performing the erase operation on a segment-by-segment basis due to a lack of a storage space is called Garbage Collection (GC).

Figure 4A:
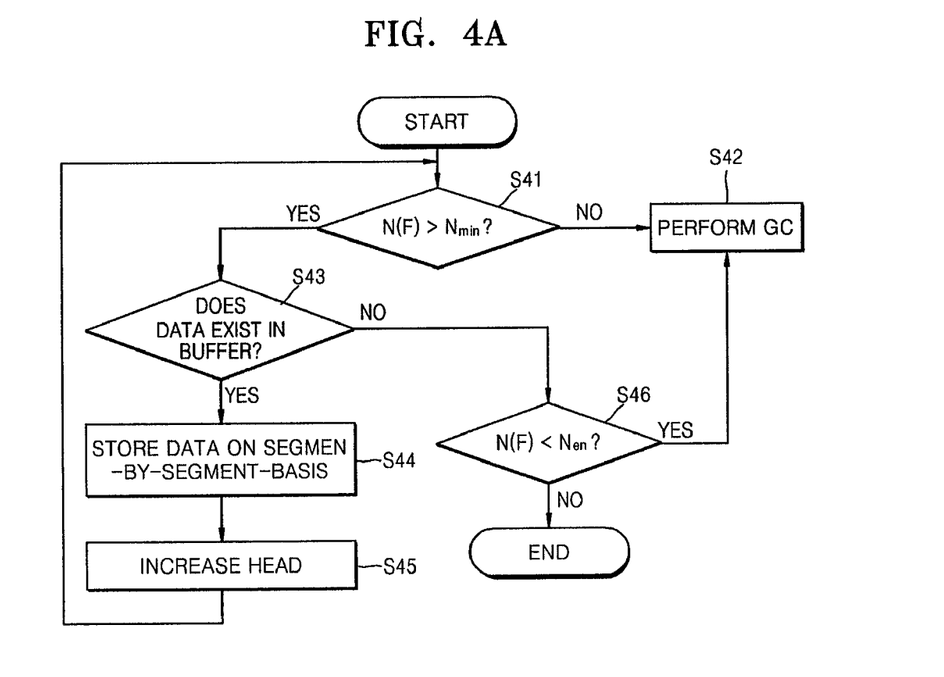
FIGS. 4A and 4B are flowcharts illustrating a method of securing a data storage space using dual journaling according to an embodiment of the present invention.
Figure 4B:
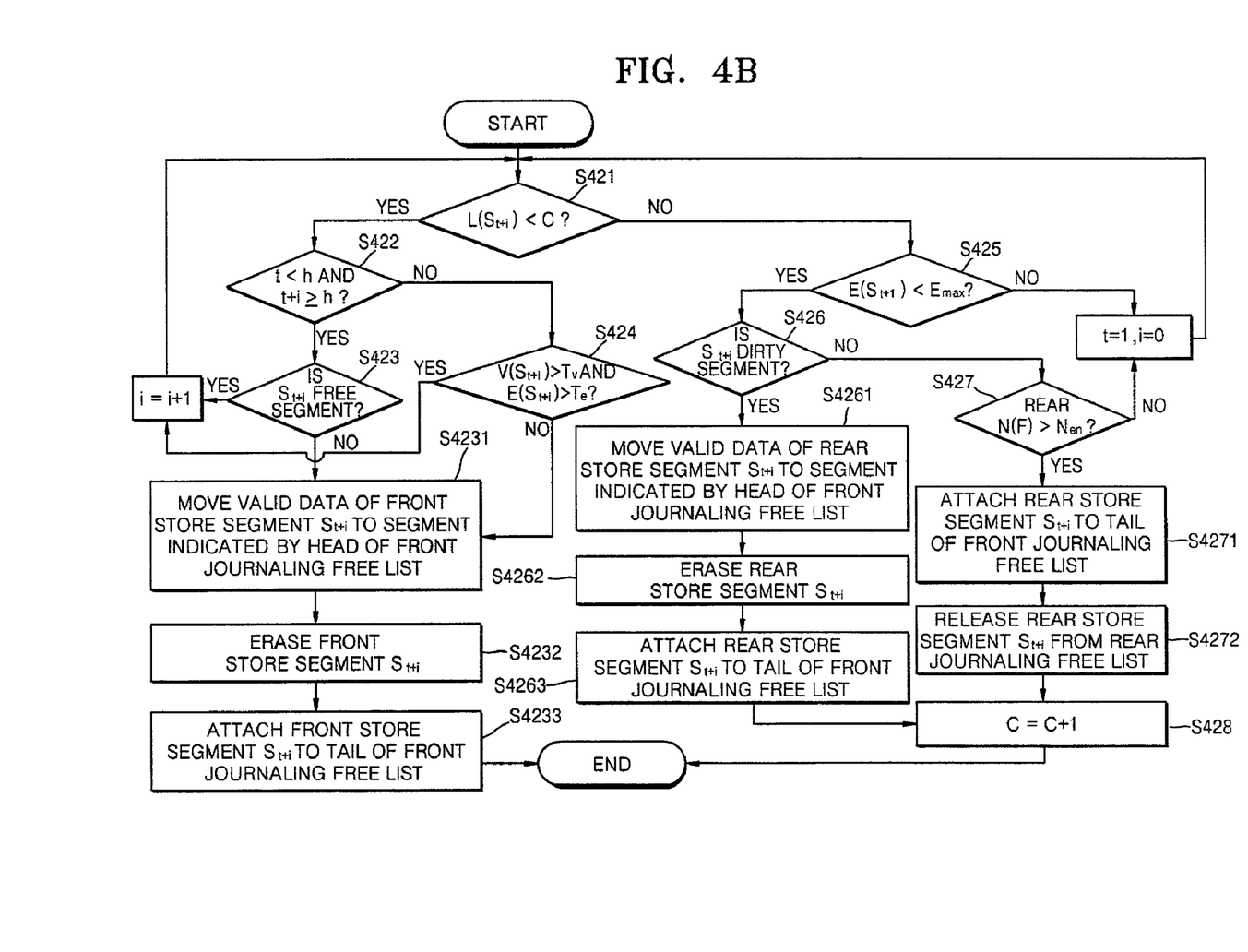

FIG. 4A is a flowchart illustrating a method of securing a data storage space using dual journaling according to an embodiment of the present invention, and FIG. 4B is a flowchart illustrating a method of performing GC illustrated in FIG. 4A, according to an embodiment of the present invention. In FIGS. 4A and 4B, it is assumed that a store operation is performed by means of front journaling. For rear journaling, it can be described the same as front journaling but in the reverse direction.

Referring to FIG. 4A, if new data to be stored is input, it is determined in operation S41 whether a sufficient vacant storage space exists in a front journaling free list, i.e., whether the number N(F) of front free segments is greater than the minimum number $N_{min}$ in the front journaling free list. If it is determined in operation S41 that N(F) is equal to or less than $N_{min}$, a free space is guarantied by performing the GC in operation S42. If it is determined in operation S41 that N(F) is greater than $N_{min}$, it is determined in operation S43 whether data to be stored exists in an input/output buffer of a memory. If it is determined in operation S43 that data to be stored exists in the input/output buffer, the data is stored from a segment indicated by a head of the front journaling free list on a segment-by-segment basis in operation S44, a head position is increased in operation S45, and the process goes to operation S41.

If it is determined in operation S43 that data to be stored does not exist in the input/output buffer, it is determined in operation S46 whether the number N(F) of front free segments is less than a threshold number $N_{en}$ of front free segments. If it is determined in operation S46 that N(F)<$N_{en}$, a free space is guarantied by performing the GC in operation S42. If it is determined in operation S46 that N(F)≧$N_{en}$, the process ends. The process of performing the GC will now be described in detail with reference to FIG. 4B.

As described above, the process of performing the GC is performed to guaranty a free space when N(F) is equal to or less than $N_{min}$ or when data does not exist in the input/output buffer and N(F) is less than $N_{en}$.

Referring to FIG. 4B, it is determined in operation S421 whether a tail of the front journaling free list arrives at the central point C. That is, it is determined whether a start location $L(S_{t+i})$ of a (t+i)th front store segment $S_{t+i}$ is less than the central point C, where t is a natural number equal to or greater than 1 and i is a natural number equal to or greater than 0.

1) A case where the start location $L(S_{t+i})$ is less than the central point C ($L(S_{t+i})<C$)

It is determined in operation S422 whether a tail t of $S_{t+i}$ exceeds a head h of $S_{t+i+1}$ ($t\leq h$ and $t+i\geq h$). If it is determined in operation S422 that $t\leq h$ and $t+i\geq h$, it is determined in operation S423 whether a segment $S_{t+i}$ is a free segment. If it is determined in operation S423 that the segment $S_{t+i}$ is a free segment, the process goes to operation S421 and the GC is performed for $S_{t+i+1}$. If it is determined in operation S423 that the segment $S_{t+i}$ is not a free segment, valid data of the front store segment $S_{t+i}$ is moved to a segment indicated by the head of the front journaling free list in operation S4231, the front store segment $S_{t+i}$ is erased in operation S4232, and the front store segment $S_{t+i}$ is attached to the tail of the front journaling free list in operation S4233.

If it is determined in operation S422 that the tail t of $S_{t+i}$ does not exceed the head h of $S_{t+i+1}$, it is determined in operation S424 whether the amount $V(S_{t+i})$ of valid data of the front store segment $S_{t+i}$ is greater than the valid data threshold $T_v$, and whether an erase count $E(S_{t+i})$ of the front store segment $S_{t+i}$ is greater than the wear-leveling threshold $T_e$. If it is determined in operation S424 that $V(S_{t+i})>T_v$ and $E(S_{t+i})>T_e$, the GC process of a segment subsequent to the front store segment $S_{t+i}$ is performed (that is, the front store segment $S_{t+i}$ is not erased, and the erase-delay of the front store segment $S_{t+i}$ is achieved). If it is determined in operation S424 that $V(S_{t+i})\leq T_v$ or $E(S_{t+i})\leq T_e$, operations S4231 through S4233 are performed.

2) A case where the start location $L(S_{t+i})$ is equal to or greater than the central point C ($L(S_{t+i})\geq C$)

It is determined in operation S425 whether the erase count $E(S_{t+i})$ of the front store segment $S_{t+i}$ is less than the maximum erase count $E_{max}$. If it is determined in operation S425 that $E(S_{t+i})\geq E_{max}$, the front store segment $S_{t+i}$ is not erased without moving the central point C, and the process goes to operation S421 to start from the start location of the front journaling free list. If it is determined in operation S425 that $E(S_{t+i})<E_{max}$, it is determined in operation S426 whether a rear store segment $S_{t+i}$ immediately next to a front store segment that crosses over the central point C is a dirty segment. If it is determined in operation S426 that the rear store segment $S_{t+i}$ is a dirty segment, valid data of the rear store segment $S_{t+i}$ is moved to a segment indicated by a head of a rear journaling free list in operation S4261, the rear store segment $S_{t+i}$ is erased in operation S4262, the rear store segment $S_{t+i}$ is attached to a tail of the rear journaling free list in operation S4263, and the central point C is increased by 1 in operation S428.

If it is determined in operation S426 that the rear store segment $S_{t+i}$ is not a dirty segment, it is determined in operation S427 whether the number N(F) of rear free segments is greater than the threshold number $N_{en}$ of rear free segments. If it is determined in operation S427 that N(F) is equal to or less than $N_{en}$, the central point C is not moved, and the process goes to operation S421 to start from the start location of the front journaling free list (t=1, i=0). If it is determined in operation S427 that N(F) is greater than $N_{en}$, the rear store segment $S_{t+i}$ is attached to the tail of the front journaling free list in operation S4271, the rear store segment $S_{t+i}$ is removed from the rear journaling free list in operation S4272, and the central point C is increased by 1 in operation S428.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

As described above, according to the present invention, if a dual journaling storing method is used when data is stored in a storage medium, by using an erase-delayed method and a segment free list, a data storing rate can be increased, a system booting time can be reduced, and efficient central point management can be performed, thereby increasing the efficiency of wear-leveling.

In addition, since a threshold of wear-leveling is set, even if power is suddenly cut off, a file system can be easily recovered, and even if free lists stored in a main memory are lost, recovery of the free lists can be easily performed by creating the free lists from start and end locations of a flash memory.

The invention claimed is:

1. A method of storing data, the method comprising:
  (a) dividing a free list of segments that are used as a data storage space of a flash memory into a front journaling free list and a rear journaling free list by setting a central point of the segment free list, and determining whether enough free segments are secured in the front journaling free list; and
  (b) if it is determined that not enough free segments are guarantied, guarantying a data storage space by collecting garbage data from among stored data with reference to a wear-leveling threshold and a valid data threshold which are set in segments in which data is stored.

2. The method of claim 1, wherein (b) comprises:
  (b1) determining whether a start location of a front segment in which data is stored (hereinafter, 'front store segment') crosses over the central point;
  (b2) if it is determined that the start location does not cross over the central point, determining whether a tail of the front store segment exceeds a head of a segment subsequent to the front store segment; and
  (b3) if it is determined that the tail does not exceed the head, determining whether the amount of valid data of the front store segment is greater than the valid data threshold and whether an erase count of the front store segment is greater than the wear-leveling threshold, and if it is determined that the amount of valid data of the front store segment is greater than the valid data threshold and the erase count of the front store segment is greater than the wear-leveling threshold, performing erase-delaying of the front store segment by not erasing the front store segment.

3. The method of claim 2, wherein (b) further comprises:

(b4) if it is determined that the amount of valid data of the front store segment does not exceed the valid data threshold and the erase count of the front store segment does not exceed the wear-leveling threshold, i.e., if data of the front store segment is valid, moving the valid data to a segment indicated by a head of the front journaling free list;

(b5) erasing the front store segment; and (b6) attaching the front store segment to a tail of the front journaling free list.

4. The method of claim 2, wherein (b) further comprises:

(b2) if it is determined that the start location crosses over the central point, determining whether an erase count of the front store segment is less than the maximum erase count of the front store segment;

(b3) if it is determined that the erase count of the front store segment is less than the maximum erase count of the front store segment, determining whether a rear store segment immediately next to a front store segment that crosses over the central point is a dirty segment;

(b4) if it is determined that the rear store segment is a dirty segment, moving valid data of the rear store segment to a segment indicated by a head of the rear journaling free list;

(b5) erasing the rear store segment;

(b6) attaching the rear store segment to a tail of the rear journaling free list; and (b7) increasing the central point.

5. The method of claim 4, wherein (b) further comprises:

(b4) if it is determined that the rear store segment is not a dirty segment, determining whether the number of free segments of the rear journaling free list is greater than the threshold number of free segments of the rear journaling free list;

(b5) if it is determined that the number of free segments is greater than the threshold number of free segments, attaching the rear store segment to the tail of the front journaling free list;

(b6) releasing the rear store segment from the rear journaling free list; and (b7) increasing the central point.

6. A computer readable recording medium storing a computer readable program for executing the method of claim 5.

* * * * *